May 18, 1965  T. F. PETERSON  3,183,658
PREFORMED HELICAL APPLIANCE FOR LINEAR BODIES
Filed Nov. 20, 1962  3 Sheets-Sheet 1
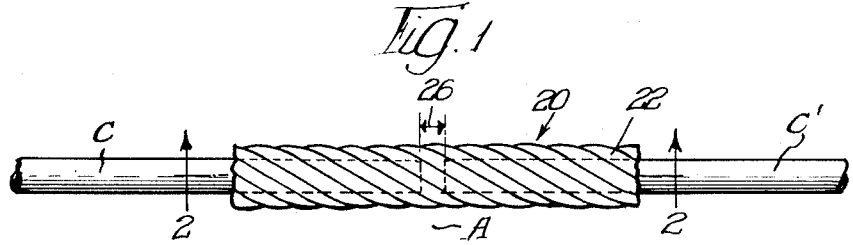
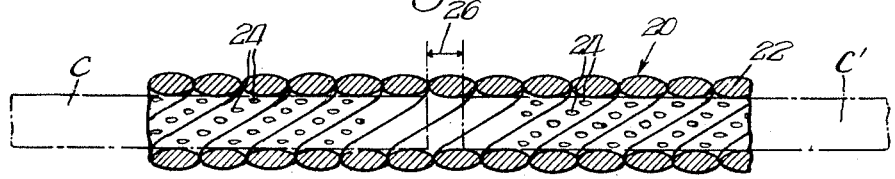
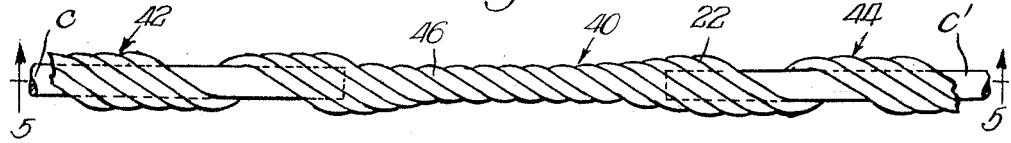
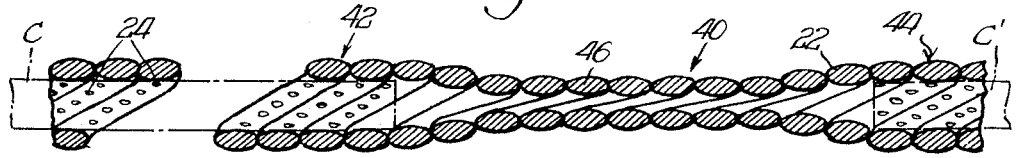
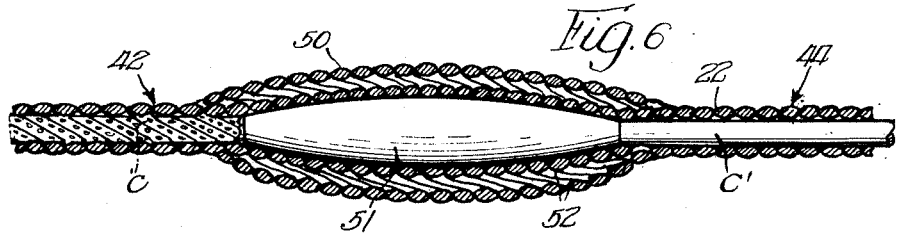

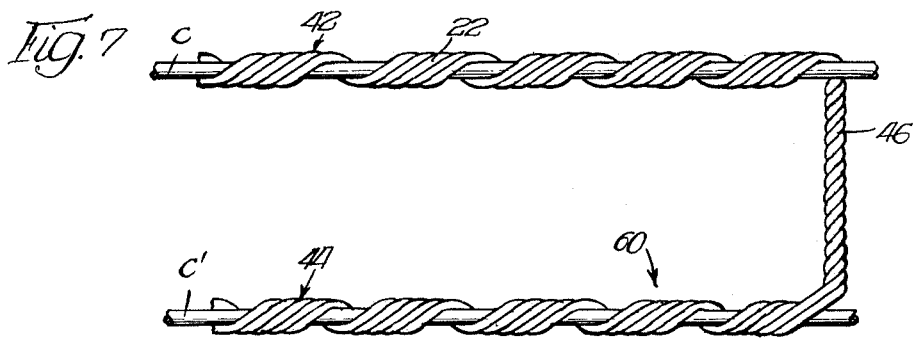
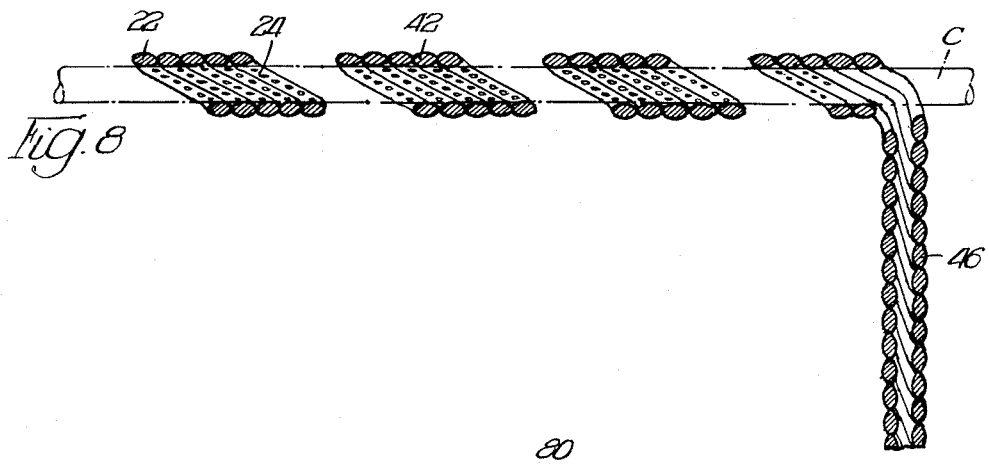
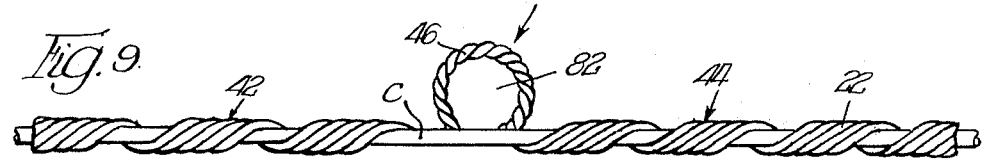
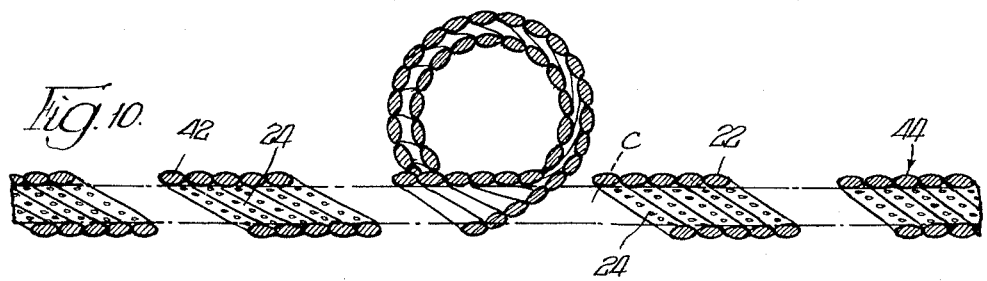

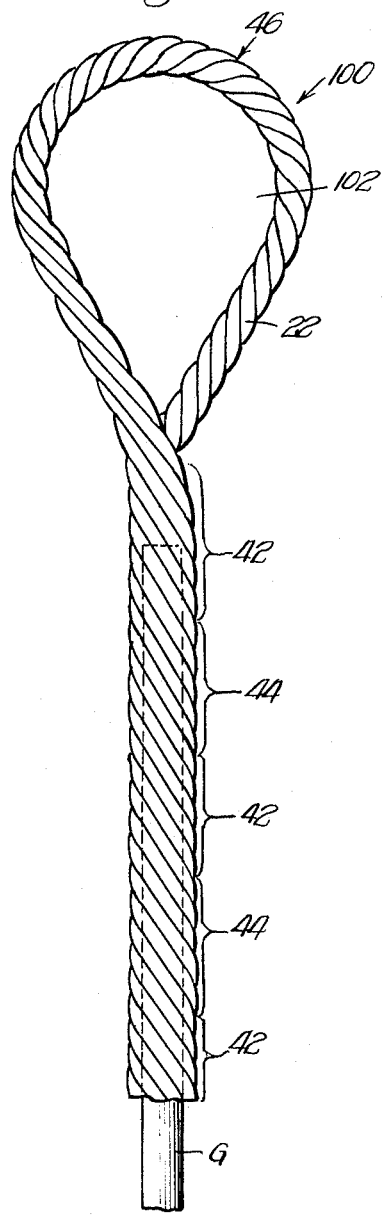
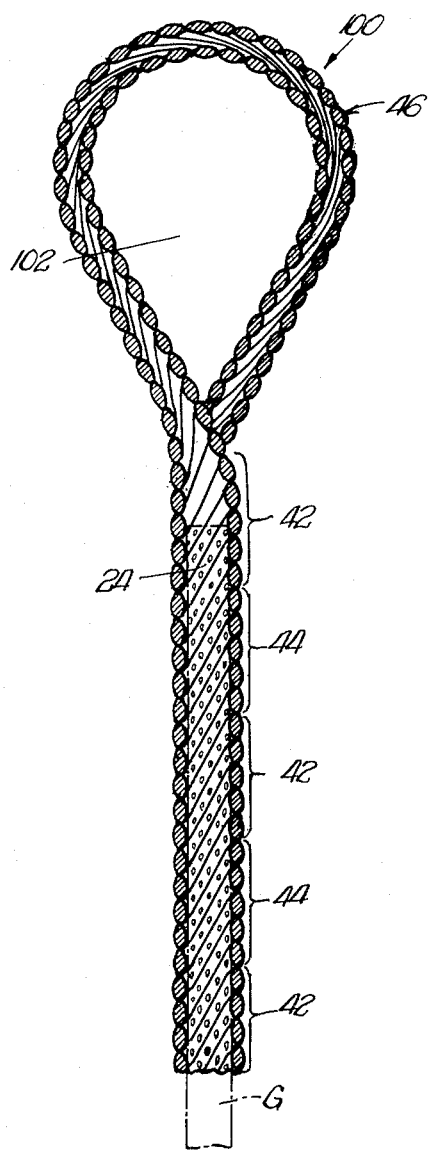

United States Patent Office 3,183,658
Patented May 18, 1965

3,183,658
PREFORMED HELICAL APPLIANCE FOR LINEAR BODIES
Thomas F. Peterson, deceased, late of Shaker Heights, Ohio, by John D. Drinko, 1956 Union Commerce Bldg., and Central National Bank of Cleveland, 123 Prospect Ave. SW., both of Cleveland, Ohio, co-executors
Filed Nov. 20, 1962, Ser. No. 239,414
14 Claims. (Cl. 57—145)

This invention relates to appliances for linear bodies, such as electrical conductors, guy wires and the like and more specifically to appliances constructed from elements helically formed prior to application to such linear bodies.

Appliances constructed from preshaped helices are enjoying widespread usage and reference is made to applicant's issued Patents Nos. 2,609,653; 2,744,707; 2,761,273; and 2,959,632. It has been found desirable, however, to enhance the natural gripping power of the helices.

A proposed method to enhance the natural gripping power of the helices is disclosed in the Payer's United States Patent No. 2,998,696, issued on September 5, 1961. This proposal comprises notching the internal surface of the appliance's preshaped helices along its entire length, the notches forming a surface which will firmly grip the linear body. This technique, however, has proved to be ineffective. The notches or the like create pre-stressed areas along the entire length of the preshaped helices of the appliance. This renders the preshaped helices, and therefore the appliance, susceptible to failure at each of these notches along the entire length. Though this inherent weakness in the appliance seldom results in failure where the stress in the system is borne by both the linear body and the appliance, failures occur at the points where the stress in the system is borne solely by the appliance.

It is, therefore, an object of the present invention to provide an appliance comprising preshaped helices which will firmly grip a linear body and yet have sufficient strength where the appliance is not in contact with the linear body to withstand, without fatigue failure, the stresses in the system.

These and other objects are accomplished in accordance with the present invention by knurling each preshaped helix of the appliance along longitudinally spaced portions in such a manner that the helices are only knurled where the appliance is in contact with linear body or bodies associated therewith. It will be understood that knurling includes notches, lines, grooves or the like, and more particularly serrations extending generally transversely of the helical axis. In this manner the appliance of the present invention will firmly grip the associated linear body, but will also have maximum strength and/or endurance at those points where the appliance does not cooperate with the linear body and thus must bear the stress of the system by itself. As will be described hereinafter, the invention is applicable to spacers, splices, lashing wire constructions and other appliances made of preshaped helices.

The invention, both as to its organization and method of operation, taken with further objects and advantages thereof, will best be understood by reference to the following description taken in connection with the accompanying drawings, in which:

FIGURE 1 is an elevational view of an appliance embodying the features of the present invention, this appliance securing the ends of two conductors together and serving as an electrical bridge therebetween;

FIGURE 2 is an enlarged cross-sectional view of the appliance shown in FIGURE 1 taken along line 2—2 of FIGURE 1, the conductors being shown in phantom;

FIGURE 3 is a fragmentary view of one preshaped helix of the appliance illustrated in FIGURE 1, this helix having been sketched to plainly show the intermittent knurling on the interior thereof;

FIGURE 4 is an elevational view of a cabled center splice appliance embodying the features of the present invention, the cabled center splice securing the ends of two conductors together and serving as an electrical bridge therebetween;

FIGURE 5 is an enlarged cross-sectional view of the cabled center splice of FIGURE 4 taken along line 5—5 of FIGURE 4, the conductors being shown in phantom;

FIGURE 6 is a sectional view of a cabled center splice shunt;

FIGURE 7 is an elevational view of a spacer appliance for adjacent suspended lines, the spacer embodying the features of the present invention;

FIGURE 8 is a fragmentary, enlarged cross-sectional view of the spacer of FIGURE 7 taken along line 8—8 of FIGURE 7, the suspended line being shown in phantom;

FIGURE 9 is an elevational view of another appliance embodying the features of the invention suited for use in lashing a conductor, line or other linear body to a supporting means, such as an insulator;

FIGURE 10 is an enlarged cross-sectional view of the appliance shown in FIGURE 9;

FIGURE 11 is an elevational view of a deadend appliance embodying the features of the present invention which is holding a guy wire; and FIGURE 12 is a cross-sectional view of the deadend appliance shown in FIGURE 11, the guy wire being shown in phantom.

In the specification and claims the term "helically formed element" will be used in describing the subject invention. By element it is meant rod-like bodies which may be constructed of any suitable material having the requisite properties for carrying out their intended purposes. Where the appliance is to be used for conducting electricity from one point to another, it is to be understood that the elements will be constructed of a conducting material such as copper, aluminum and the like. In the drawings the elements are shown as having elliptical cross-sections for purposes of example, but it will be understood that they may have circular or other cross-sections.

Referring now to FIGURES 1–3 there is shown a first embodiment of the present invention, a splice indicated by reference numeral 20. The splice 20 is adapted for electrically splicing the ends of two conductors C and C' in an electrical suspension whereby current will pass from one conductor to the other. The conductors C and C' are of any conventional type and may be composed of a single strand or a plurality of strands.

The splice 20 is composed of a plurality of elements 22 which have been helically formed for their entire length prior to their being applied to the conductors C and C'. The elements 22 are formed so that the helix has an internal diameter and pitch length of sufficient magnitude to permit them to be applied from the side, without exceeding their elastic limits, to the conductors C and C'. The elements 22 have an internal diameter somewhat less than the external diameter of the conductors C and C' so that they contact or engage the conductors C and C'. In this manner the conductors C and C' force the elements 22 to extend upon their application to the conductors C and C'.

In accordance with the present invention, the contact between the helical elements 22 and conductors C and C' is enhanced by knurling intermittent areas of the interior of the helical elements 22. This knurling is indicated generally by reference numeral 24 and it will be understood that it may consist of lines, notches or the like, and preferably a plurality of serrations extending generally transversely of the helical axis, which have been cut or otherwise placed on the interior of the helical elements 22. However, in accordance with the present invention, the knurling 24 is effected only at those points at which the elements 22 of the splice 20 will be in contact with the conductors C and C′ as evident from FIGURE 2. The knurling 24 enhances the gripping engagement of the conductors C and C′ by the helical elements 22 whereby an excellent electrical union is formed in order that electrical current flows from one conductor to the other through the splice 20 with a minimum drop in potential. In one preferred embodiment it has been found that if the initial internal diameter of the helix is 85 percent of the external diameter of the conductor, optimum gripping characteristics are obtained.

As described hereinbefore, the splice 20 is adapted to receive the conductors C and C′ and is helically formed in accordance with the gauge and type of conductor. The conductors C and C′ may be of dissimilar, as well as of similar, types and sizes. In the instance where they are dissimilar it may be necessary to form the end portions of the splice 20 of different helical pitch lengths and diameters. It will be understood that the helical elements 22 which comprise the splice 20 may be wrapped individually or in groups about the ends of the conductors C and C′. Alternatively, the ends of the conductors C and C′ may be forced into opposite ends of the splice 20.

When the conductors C and C′ are in position and firmly held by the splice 20, such as indicated in FIGURES 1 and 2, there will be an intermediate portion of the splice 20 which does not engage the conductors C and C′. This intermediate portion is indicated by reference numeral 26. A suspended line, a portion of which is shown in FIGURES 1 and 2, will be subjected to substantially uniform stress at every point along its length. However, with the exception of the intermediate portion 26, the splice 20 will be cooperatively engaging conductor C or C′. Thus, except for the intermediate portion 26, where there is no engagement between the splice 20 and a linear body, the stress will be accepted by the helical elements 22 and the conductor C or C′. Thus in those areas where there is such cooperation the strength requirements of the elements 22 in the appliance 20 are reduced. However, in the intermediate portion 26 the stress in the line therethrough must be borne solely by the helical elements 22 and in accordance with the present invention the elements are not knurled in this area. Furthermore, to assure that the knurling is not present in the intermediate area the unknurled area is made of a greater length than would normally exist between the ends of the conductors C and C′, as is seen in FIGURE 2. It is therefore apparent that in accordance with the present invention the appliance 20 affords enhanced gripping where in contact with the linear body without reduced strength due to "notch effect" where it is not in contact with the linear body.

Referring now to FIGURES 4 and 5 there is shown another appliance embodying the features of the invention: a cabled center splice indicated generally by reference numeral 40. The cabled center splice 40 is adapted to be used for electrically splicing the ends of two suspended conductors C and C′ to pass current therethrough from one conductor to the other. As in the splice 20, the cabled center splice 40 is composed of a plurality of elements 22. In this embodiment, however, fewer elements 22 are employed so that end portions 42 and 44 of the splice 40 form a partial lay or envelope, as seen in FIGURE 4, as compared with the full lay ends of the splice 20. The end portions 42 and 44 are adapted to embrace the conductors C and C′. Intermediate the end portions 42 and 44, the elements 22 have been tightly twisted to a closed lay portion 46, which preferably has a diameter somewhat less than that of the conductors C and C′.

As best seen in FIGURE 5, the interior of the elements 22 in the portions 42 and 44 have knurling 24 discussed hereinbefore. The conductors C and C′ are inserted into the ends 42 and 44, respectively, and as will be seen in FIGURE 5 are gripped by the knurled portions of the cabled center splice 40. The center or closed lay portion 46 is not knurled. In this manner, in accordance with the present invention, the center portion 46, which must bear the stress in the line all by itself, is not weakened by knurling, while the end portions 42 and 44 which contact the conductors C and C′ have knurling 24 to enhance the gripping contact therebetween.

Referring now to FIGURE 6 there is shown another appliance embodying the invention; a splice shunt indicated generally by the reference numeral 50. The splice shunt is adapted to electrically splice the conductors C and C′ and to be used in conjunction with a mechanical splice indicated generally by the numeral 51. The splice shunt is constructed of the elements 22 which have been electrically formed throughout the portions 42 and 44 as described previously. Intermediate the portions 42 and 44 the elements 22 have been subdivided into the groups 52 with each group being tightly twisted to form a closed lay portion. The intermediate portions 52 are disposed around the mechanical splice 51 and are adapted to shunt the current between the conductors C and C′. For a more complete description of the construction and operation of the splice shunt reference is made to applicant's copending application Serial No. 96,522 filed March 17, 1961. In order to enhance the gripping characteristics of the end portions 42 and 44, the elements 22 comprising the same are knurled in those areas contacting the conductors C and C′.

Referring now to FIGURES 7 and 8 there is shown another appliance embodying the features of the present invention; a spacer being indicated generally by reference numeral 60. The spacer 60 is adapted to maintain generally parallel lines or conductors C and C′ in their spaced relationship and for transmitting current one to the other if such should be desired. The spacer 60 is constructed of the elements 22 which have been helically formed throughout the portions 42 and 44 as described previously. Intermittent the portions 42 and 44 the elements 22 have been tightly twisted to form a closed lay portion 46 as previously described. The spacer 60 is generally U-shaped, with the helically formed portions 42 and 44 constituting the sides thereof and the closed lay portion 46 connecting the two or forming the cross portion of the U. It will be understood that the spacer 60 may take other forms such as those shown in the aforementioned patents.

In accordance with the present invention the inside of the elements 22 have knurling 24 on the interior thereof at the end portions 42 and 44 where the appliance 60 is in contact or engagement with the conductors C and C′. The closed lay portion 46 is not knurled. As seen in FIGURE 8, for example, the knurling 24 is only present where the portion 42 of the appliance 60 is in contact with the conductor C. It will be understood that the other end portion 44 is similarly knurled.

It will be understood that the helically formed end portion 42 is adapted to be applied to the conductor C and the helically formed end portion 44 to the conductor C′. The closed lay portion 46 resiliently maintains the conductors C and C′ in their generally spaced relationship as previously mentioned. The resiliency of the closed lay portion 46 permits some deflection of the lines at the point of coincidence so as to minimize any areas of stress concentration which would be conducive to fatigue failure. The closed lay portion 46 further provides, in the event that current is to be transmitted from one conductor to another, a homogeneous distribution of electrical elements 22. This will be further understood by reference to applicant's copending application Serial No. 96,522, filed March 17, 1961.

Referring now to FIGURES 9 and 10, there is illustrated still another appliance of the invention adapted to be used for suspending a conductor C to an insulator or other suitable support (not shown) and is generally designated by reference numeral 80. The appliance 80 is composed of a partial lay of elements 22 which have been helically formed in a manner previously described for the portions 42 and 44 of their length. Intermediate the portions 42 and 44 the elements 22 have been tightly twisted to a closed lay 46 which has been bent back on itself to form a closed loop 82 with the portions 42 and 44 extending in opposite directions from the loop 82. In this embodiment the elements 12 form a partial lay or envelope in the portions 42 and 44 which are adapted to embrace the conductor C. The elements 22 are in bridging relationships so as to form a helical band throughout the portions 42 and 44 and thus only partially cover the conductor C as best seen in FIGURE 9. The closed loop 82 is preferably formed to a diameter somewhat less than that of the insulator to which it is applied. In this manner, when the loop 82 is applied to the insulator it tightly embraces the latter to prevent inadvertent displacement therefrom. After the loop 82 has been applied to the insulator the helically formed portions 42 and 44 are then wrapped around the conductor C so as to grippingly hold the same.

To these ends, and in accordance with the present invention, the portions 42 and 44 of the elements 22 have knurling 24 on the interior thereof in the manner described hereinbefore. Again, it will be noted, in particular with reference to FIGURE 10, that the appliance 80 does not contain any knurling except where it is to be in contact with conductor C.

Referring now to FIGURES 11 and 12, there is illustrated still another appliance embodying the features of the present invention. The appliance is adapted to be used as a deadend for a guy wire G and is indicated generally by reference numeral 100. The appliance 100 is composed of a partial lay of elements 22 which have been helically formed in the manner previously described for the portions 42 and 44 of their length. Intermediate the portions 42 and 44 the elements 22 have been tightly twisted to a closed lay portion 46. The elements 22 have been bent around to form a closed loop or bight 102, with the portions 42 and 44 being intertwisted around the guy wire G and extending in one direction from the bight 102. In this embodiment the elements 22 form a complete lay over the guy wire G as seen in FIGURE 11. In this manner the deadend appliance 100 may be used to secure the guy wire G where desired on a hook or the like.

As best seen in FIGURE 12, only those areas of the end portions 42 and 44 which contact the guy wire G have knurling 24 on the interior thereof. This knurling, in the manner described hereinbefore, enhances the gripping of the portions 42 and 44 on the conductor C. The closed lay portion 46 of the elements 22 is not knurled so that there is no weakening in the areas of the appliance 100 which must bear the stress by themselves.

From the foregoing it will be seen that the subject invention provides an appliance particularly suitable for use in conjunction with electrical conductors. In particular, the invention is adapted to be used where electrical current is to be passed from one conductor to another. However, the invention has applicability in those instances where current is not to be transmitted by the appliance, i.e. in the embodiment shown in FIGURES 11 and 12.

While the embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An appliance for use in conjunction with linear bodies such as electrical conductors, cables and the like comprising a plurality of helically formed elements, said helically formed elements being of a mutually conforming and sufficiently open internal diameter and pitch length to permit application to a linear body from the side without exceeding their elastic limit, said helical elements being coextensive to at least partially enclose said linear body, each of said elements being knurled along longitudinally spaced portions of its length and having unknurled portion intermediate said spaced portions with the knurling being only on those portions in contact with a linear body.

2. In an appliance for use in conjunction with linear bodies such as electrical conductors, cables and the like comprising a helically formed element of a sufficiently open internal diameter and pitch length to permit application to a linear body from the side without exceeding its elastic limit, said helical element comprising longitudinally spaced portions having knurled surfaces and unknurled portions intermediate said spaced portions, the knurling on said spaced portions comprising a plurality of serrations extending generally transversely of the helical axis and being on those portions in contact with a linear body.

3. The combination comprising a linear body such as electrical conductors, cables and the like, and a helically formed element of a sufficiently open pitch and internal diameter to permit application to said linear body from the side without exceeding its elastic limit, said helical element for portions of its length being in coextensive tightly gripping relationship with said linear body and for other portions of its length being spaced from said linear body, said portions in tightly gripping relationship with said linear body including a plurality of transverse serrations on those areas in contact with said linear body and said other portions of said helical element which are spaced from said linear body being unknurled.

4. A splice for securing first and second linear bodies in a co-axial relationship, comprising a plurality of co-extensive helically formed elements of substantially identical and sufficiently open internal diameter and pitch length to permit application to said linear bodies in tightly gripping relationship therewith without exceeding the elastic limit of said elements, said elements being adapted to encircle the first of said linear bodies adjacent its end for a first portion of their lengths and to encircle the second of said linear bodies adjacent its end for a second portion of their lengths, said first and second portions being spaced and defining an intermediate portion adapted to bridge said linear bodies, said first and second portions being knurled to form a gripping surface on those areas in contact with the respective linear bodies, said elements throughout said intermediate portion being unknurled.

5. The invention according to claim 4 in which said elements throughout said intermediate portion are formed to an internal helical diameter materially less than the internal helical diameter of said first and second portions.

6. An appliance for bridging between a first linear body and a second linear body, comprising a plurality of helically formed elements of substantially identical and sufficiently open internal diameter and pitch length to permit application to said linear bodies in tightly gripping relationship therewith without exceeding the elastic limit of said elements, said elements being adapted to encircle the first linear body for a first portion of their lengths and to encircle the second linear body for a second portion of their lengths, said first and second portions being spaced and defining an intermediate portion bridging said first and second linear bodies, said first and second portions being knurled to form a gripping surface on those areas in contact with the respective linear bodies, said elements throughout said intermediate portion being unknurled.

7. The invention according to claim 6 where said elements throughout said intermediate portion are formed to an internal helical diameter materially less than the internal helical diameter of said first and second portions.

8. The invention according to claim 6 where said appliance comprises a spacer in which said first and second portions are substantially parallel and said intermediate portion lies at substantially right angles to said first and second portions.

9. An appliance for holding a linear body, comprising a plurality of helically formed elements of substantially identical and sufficienty open internal diameter and pitch length to permit application to said linear body in tightly gripping relationship therewith without exceeding the elastic limit of said elements, said elements having a first portion and a second portion adapted to encircle said linear body for their lengths, said first and second portions being spaced and defining an intermediate portion, said first and second portions being wrapped around said linear body to form a complete lay over said linear body, said first and second portions having areas in contact with said linear body, said areas being knurled to form a gripping surface, said intermediate portion having an internal helical diameter substantially less than the internal helical diameter of said first and second portions, said intermediate portion forming a bight when said first and second portions are applied to said linear body, and said elements throughout said intermediate portion being unknurled.

10. An appliance for holding a linear body, comprising a plurality of helically formed elements of substantially identical internal diameter and pitch length, said elements being return bent at substantialy their mid-points to form a bight portion and first and second leg portions, said first and second leg portions being intertwisted to form a linear body gripping portion adapted to encircle a linear body in tightly gripping relationship, said first and second leg portions being knurled along the surface areas adapted to contact said linear body, said elements throughout said bight portion being substantially unknurled.

11. An appliance as defined in claim 10 in which said helically formed elements are of a substantially smaller internal diameter throughout said bight portion than throughout said first and second leg portions.

12. An appliance as defined in claim 11 in which said first and second leg portions are helically formed to an internal diameter and pitch length sufficiently open to permit application of the same from the side to a linear body without exceeding the elastic limits of said elements.

13. A dead end comprising an elongated body, a helically formed element return bent adjacent its mid-point to define a bight having legs projecting therefrom, said legs being formed to an internal diameter less than the outside diameter of said body and being wrapped around said body so that their helical axes are co-axial and in tightly gripping relationship therewith, each of said legs being knurled in the areas of contact with said body, the surface of said element throughout said bight being unknurled.

14. The combination comprising a pair of linear bodies such as electrical conductors, cables and the like, and a plurality of helically formed elements of substantially identical and sufficiently open internal diameter and pitch length to permit application from the side to said linear bodies without exceeding the elastic limit of said elements, said elements being mutually co-extensive and in a tightly gripping co-axial relationship for a first portion of their lengths with the first of said pair of said linear bodies and in a tightly gripping co-axial relationship for a second portion of their lengths with the second of said pair of linear bodies, said first and second portions being spaced to define an intermediate portion bridging between said first and second linear bodies, said first and second portions being knurled on those areas in contact with the respective linear bodies, said intermediate portion being unknurled.

References Cited by the Examiner

UNITED STATES PATENTS

| 2,609,653 | 9/52 | Peterson | 57—145 |
| 2,761,273 | 9/56 | Peterson | 57—145 |
| 2,888,726 | 6/59 | Smith | 24—129 X |
| 2,947,504 | 8/60 | Ruhlman | 57—145 X |
| 2,959,632 | 11/60 | Peterson. | |
| 2,998,696 | 9/61 | Payer | 57—145 |

FOREIGN PATENTS

| 232,105 | 4/25 | Great Britain. |
| 817,055 | 7/59 | Great Britain. |

MERVIN STEIN, *Primary Examiner.*